…

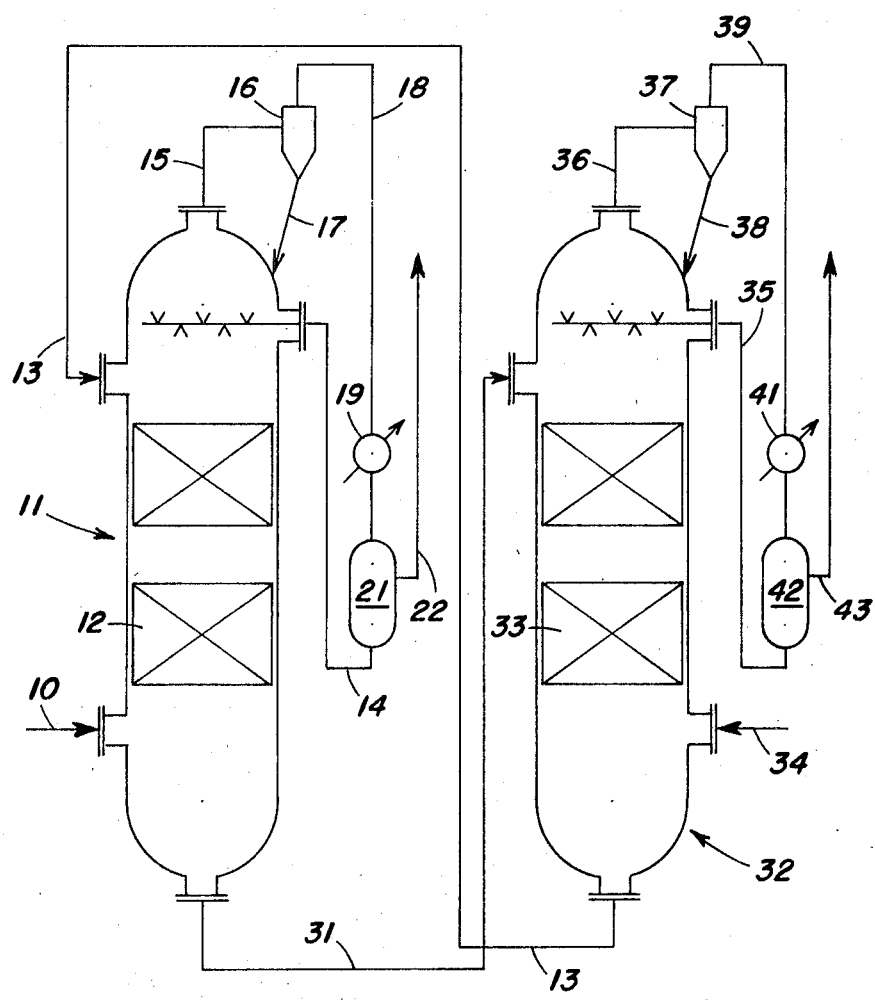

3,641,157
HYDROCARBON OXIDATION
Herbert Riegel, Palisades, N.J., Harvey D. Schindler, New York, N.Y., and Morgan C. Sze, Upper Montclair, N.J., assignors to The Lummus Company, Bloomfield, N.J.
Filed Oct. 23, 1968, Ser. No. 769,792
Int. Cl. C07c 45/02
U.S. Cl. 260—599                                    17 Claims

ABSTRACT OF THE DISCLOSURE

Process for producing a carbonyl compound or acid wherein a feed containing a hydrocarbon is contacted with an oxygen-containing gas a melt containing a multivalent metal halide in both its higher and lower valence state. The preferred melt contains a mixture of copper chlorides.

---

This invention relates to the oxidation of hydrocarbons and more particularly to the production of aldehydes, ketones and acids from hydrocarbons.

The production of aldehydes, ketones or acids from hydrocarbons is known in the art, but in general such production requires an expensive starting material or the initial production of intermediates. Thus, for example, in producing acetaldehyde from a hydrocarbon, the starting material is generally ethylene, an expensive starting material. In the production, for example, of benzaldehyde, the starting material may be toluene, but the toluene is initially converted to a chloro-substituted intermediate which is subsequently converted to benzalehyde.

An object of this invention is to provide a new and improved process for producing aldehydes, ketones and acids.

A further object of this invention is to provide a process for producing carbonyl compounds from hydrocarbons.

Another object of this invention is to provide a process for producing carbonyl compounds from hydrocarbons which may be effected in a single reactor.

A still further object of this invention is to provide a process for producing aldehydes which permits the use of a lower costing starting material.

These and other objects of the invention should be more readily apparent from the following detailed description thereof when read with reference to the accompanying drawing wherein:

The drawing is a simplified schematic flow diagram of an embodiment of the invention.

The objects of this invention are broadly accomplished by contacting a feed, containing a hydrocarbon, with a melt containing a multivalent metal halide in both its higher and lower valence state and an oxygen-containing gas to produce an oxygen-containing derivative of the hydrocarbon, either an aldehyde, ketone, or acid, generally an aldehyde or ketone.

The melt contains a halide of a multivalent metal, i.e., a metal having more than one positive valence state, such as manganese, iron, copper, cobalt and chromium, preferably a chloride or bromide of the metal, with the copper chlorides and bromides, in particular the copper chlorides, being preferred. In the case of higher melting multivalent metal halides, such as copper chlorides, a halide of a univalent metal; i.e., a metal having only one positive valence state, which is nonvolatile and resistant to the action of oxygen under the process conditions is added to the multivalent metal halide to form a molten salt mixture having a reduced melting point. The univalent metal halides, the chlorides and bromides, particularly the chlorides, being preferred, are preferably alkali metal halides, such as potassium and lithium chloride in particular, but is is to be understood that other metal chlorides and mixtures thereof, such as the heavy metal halides of Groups I, II, III and IV of the Periodic Table; e.g., zinc, silver, and thallium chloride, may also be employed. The univalent metal halides are generally added in an amount sufficient to adjust the melting point of the molten salt mixture to a temperature of below about 500° F., and in the case of a salt mixture of copper chloride and potassium chloride, the composition of the melt ranges between about 20% and about 40%, preferably about 30%, by weight, potassium chloride, with the remainder being copper chloride. The melt generally contains at least 5%, by weight, of the higher valent metal halide, although generally greater amounts are preferred. It is to be understood, however, that in some cases the catalyst melt may have a melting point higher than 500° F., provided the catalyst remains in the form of the melt throughout the processing steps. It is further to be understood that the melt may contain a mixture of multivalent halides or other reaction promoters such as palladium chloride; e.g., from 0.5–4.0 wt. percent. It is also to be understood that in some cases the multivalent metal halide(s) may be maintained as a melt without the addition of a univalent metal halide.

The hydrocarbon of the feed may be: an alkane, generally an alkane containing from about 1–18 carbon atoms, such as methane, ethane, propane, the various butanes and the like, to produce mainly the corresponding aldehyde and in some cases small amounts of ketone; an alkene, generally an alkene containing no more than about 18 carbon atoms, such as ethylene, propylene, the various butenes and the like, to produce mainly the corresponding ketone, except in the case of ethylene wherein the product is mainly acetaldehyde; an alkyl substituted aromatic hydrocarbon which may contain more than one alkyl substituent group, preferably an alkyl substituted benzene wherein the alkyl group contains from about 1–18 carbon atoms, preferably from 1–4 carbon atoms, such as toluene, the various xylenes, cumene, and the like, to produce mainly the corresponding aldehyde; an alkenyl substituted aromatic hydrocarbon, preferably an alkenyl substituted benzene wherein the alkenyl group contains no more than 18 carbon atoms, preferably from about 2–4 carbon atoms, such as styrene, and the like, to produce mainly the corresponding ketone except in the case of an alkenyl group of two carbon atoms wherein the product is mainly an aldehyde; or a cycloalkane, preferably one containing from about 4 to about 12 carbon atoms, such as cyclohexane, cyclododecane, and the like, to produce the corresponding ketone. It is to be understood that the feed may contain two or more of such compounds in which case the effluent contains a mixture of carbonyl products.

The feed containing the hydrocarbon may be contacted with the hereinabove described melt, preferably a melt containing copper chlorides, in the presence of an oxygen-containing gas, such as air, at temperatures from about 500° to about 950° F., preferably at temperatures from about 550° to about 850° F., and pressures from about 1 to about 30 atmospheres. The contacting is preferably effected in a countercurrent fashion, with the hydrocarbon-containing feed and oxygen-containing gas as a continuous vapor phase, at residence times from about 1 to about 100 seconds. The choice of optimum reaction conditions varies with the particular reactants and, therefore, the hereinabove described conditions are illustrative of the invention and the scope thereof is not to be limited thereby. It is further to be understood that by-products are also producing during the reaction; for example, some dehydrogenation of the feed is also effected, particularly at higher temperatures within the hereinabove noted temperature range, and, therefore, the reaction conditions are generally controlled to minimize such production. The separation of the resulting by-products in order to recover the desired product may be effected by a wide variety of well-known procedures and, therefore, no detailed explanation thereof is deemed necessary.

The melt in addition to functioning as a reactant and/or catalyst is a temperature regulator. Thus, the circulating melt has a high heat absorption capacity thereby preventing runaway reaction during the exothermic oxidation. The absorbed heat of reaction may be employed to heat the various reactants to reaction temperature. Alternatively, or in addition to such an expedient, the melt may be contacted with an inert gas coolant to remove any additional heat of reaction, with the inert gas being sussequently cooled and re-employed for removing heat from the melt.

This invention will now be further described with reference to an embodiment thereof illustrated in the accompanying drawing. It is to be understood, however, that the scope of the invention is not to be limited thereby.

Referring now to the drawing, an oxygen-containing gas, such as air, and a feed to be converted to a carbonyl compound, such as ethane, in line 10 is introduced into a reactor 11, containing suitable packing 12 or other liquid-vapor contacting devices. A melt containing a multivalent metal halide in both its higher and lower valence state, such as a mixture of cupric and cuprous chloride, is introduced into reactor 11 through line 13 in the form of a melt and countercurrently contacts the mixture introduced through line 10. The melt may further contain an alkali metal chloride, such as potassium chloride. As a result of such contact, the feed is converted to the corresponding carbonyl compound.

An effluent, containing the carbonyl compound is contacted in the top of reactor 11 with a quench liquid introduced through line 14, resulting in condensation of vaporized melt and vaporization of quench liquor. The vaporized quench liquid and effluent is withdrawn from reactor 11 through line 15 and introduced into a cyclone separator 16 to effect separation of entrained catalysts. The separated catalyst is withdrawn from separator 16 through line 17 and returned to the reactor 11. The combined effluent vaporized quench liquid is withdrawn from separator 16 through line 18, passed through condenser 19 to effect condensation of the quench liquid and the vapor-liquid mixture introduced into a separator 21. The quench liquid is withdrawn from separator 21 in line 14 and recycled to the reactor 11. The effluent is withdrawn from separator 21 through line 22 and passed to separation and recovery.

The melt, now at an elevated temperature, due to absorption of the heat of reaction, is withdrawn from reactor 11 through line 31 and introduced into the top of a vessel 32, containing suitable packing 33 or other gas-liquid contact devices. An inert coolant gas is introduced into the bottom of vessel 32 through line 34 and countercurrently contacts the descending melt to effect cooling thereof. The melt withdrawn from the bottom of vessel 32 through line 13 which has been cooled as a result of contacting the inert gas is now recycled to reactor 11.

The heated inert gas is contacted in the top of vessel 32 with a quench liquid introduced through line 35, resulting in condensation of vaporized catalyst melt and vaporization of the quench liquid. The vaporized quench liquid and inert gas is withdrawn from vessel 32 through line 36 and introduced into a cyclone separator 37 to effect removal of entrained catalyst. The separated catalyst is withdrawn from separator 37 through line 38 and recycled to the vessel 32. The vaporized quench liquid and inert gas are withdrawn from separator 37 through line 39, passed through condenser 41 to effect condensation and cooling of the quench liquid and the gas-liquid mixture introduced into a separator 42. The now cooled quench liquid is withdrawn from separator 42 through line 35 and recycled to the vessel 32. The cooled inert gas is withdrawn from separator 42 through line 43 and recycled to the vessel 32.

It is to be understood that numerous varitions of the hereinabove described processing sequence are possible within the spirit and scope of the invention. Thus, for example, the oxygen-containing gas and feed may be separately introduced into reactor 11. In addition, the melt may be cooled in a manner other than as particularly described. These and other modifications should be apparent to those skilled in the art from the teachings contained herein.

The invention is further illustrated by the following example, but the scope of the invention is not to be limited thereby:

EXAMPLE I

This example illustrates the oxidation of propane.

Reaction temperature—496° C.
Reaction pressure—1 atm.
Molten salt:
    KCl—30 wt. percent
    CuCl—53 wt. percent
    $CuCl_2$—17 wt. percent
Residence time—4.9 seconds
Duration of test—1.75 hours
Gas hourly spaced velocity, GHSV—140
Feed rate:
    Propane vapor—0.52 gm.-ml./hr.
    Air—0.30 gm.-ml./hr.
Propane conversion—18.1%

Products

| Component: | Mole percent propane converted |
|---|---|
| $CH_4$ | 2.2 |
| $CO_2$ | 2.1 |
| $C_2H_4$ | 9.5 |
| $C_3H_6$ | 62.6 |
| $C_3H_6O$ (propylene oxide) | 1.0 |
| Ketones and aldehydes (calculated as propionaldehyde) | 22.6 |
| Organic chlorides | Trace |
| | 100.0 |

Chlorine as HCl in product—0.008 gm.-ml./hr.

EXAMPLE II

Heptane is oxidized under the following conditions:

Reaction temperature—427° C.
Reaction pressure—1 atm.
Molten salt:
    KCl—30 wt. percent
    CuCl—40 wt. percent
    $CuCl_2$—30 wt. percent
Residence time—10.7 sec.
Duration of test—3 hours
Gas hourly space velocity, GHSV—71
Feed rate, gm.-ml./hr.:
    n-Heptane —0.196
    Oxygen—0.161
n-Heptane conversion—77%.

The reaction product contains heptanal and some ketone.

EXAMPLE III

The following illustrates the production of benzaldehyde from toluene:

Reaction temperature—371° C.
Reaction pressure—1 atm.
Molten salt:
    KCl—30 wt. percent
    CuCl—40 wt. percent
    $CuCl_2$—30 wt. percent
Residence time—7 sec.
Duration of test—3 hours Gas hourly space velocity, GHSV—118
Feed rate, gm.-ml./hr.:
 Toluene—0.30
 Oxygen—0.30
Toluene conversion—45%

The reaction product contains benzaldehyde.

EXAMPLE IV

The procedure of Example II is repeated except that the feed is propylene.
The reaction product contains acetone.

EXAMPLE V

The procedure of Example III is repeated except that the feed contains styrene.
The reaction product contains 2-phenylethanal.

EXAMPLE VI

The procedure of Example III is repeated except that the feed contains cyclohexane.
The reaction product contains cyclohexanone.

EXAMPLE VII

The procedure of Example II is repeated except that the feed is ethane and the melt has the following composition:

| | Weight percent |
|---|---|
| $FeCl_2$ | 58 |
| $FeCl_3$ | 8 |
| KCl | 34 |

The reaction product contains acetaldehyde.

EXAMPLE VIII

The procedure of Example I is repeated except that the feed is p-xylene and the melt has the following composition:

| | Weight percent |
|---|---|
| $MnCl_2$ | 3 |
| $MnCl_4$ | 80 |
| KCl | 17 |

The reaction product contains p-methyl benzaldehyde.

EXAMPLE IX

The procedure of Example III is repeated except that the feed is cyclododecane and the melt has the following composition:

| | Weight percent |
|---|---|
| $CoCl_2$ | 14 |
| $CoCl_3$ | 49 |
| KCl | 37 |

The reaction product contains cyclododecanone.

EXAMPLE X

The procedure of Example I is repeated except that the feed is butene and the melt has the following composition:

| | Weight percent |
|---|---|
| $CrCl_2$ | 5 |
| $CrCl_3$ | 74 |
| KCl | 21 |

The reaction product contains methyl ethyl ketone.

EXAMPLE XI

The procedure of Example I is repeated except that the feed is ethane and the melt, which includes palladium chloride has the following composition:

| | Weight percent |
|---|---|
| KCl | 27 |
| CuCl | 53 |
| $CuCl_2$ | 17 |
| $PdCl_2$ | 3 |

The reaction product contains acetaldehyde.
The hereinabove examples are also repeated with bromides and iodides of the multivalent metals with similar results.

The process of the invention is advantageous in that carbonyl compounds may be produced from a wide variety of feeds in a single reactor. In some cases, the carbonyl compound is further oxidized to the corresponding acid and, therefore, the reactor effluent may contain a mixture of oxidation products. As another advantage, aliphatic aldehydes may be produced by the oxidation of saturated aliphatic hydrocarbons. These and other advantages should be readily apparent to those skilled in the art.

Numerous modifications and variations of the invention are possible in the light of the above teachings and, therefore, the invention may be practiced otherwise than as particularly described.

What is claimed is:
1. A process for producing a carbonyl compound from a feed containing at least one member selected from the group consisting of an alkane, an alkene, a cycloalkane, an alkyl substituted aromatic hydrocarbon and an alkenyl substituted aromatic hydrocarbon, comprising:
 contacting the feed in vapor phase at 500°–950° F. with an oxygen-containing gas and a melt comprising a multivalent metal halide in both its higher and lower valence state wherein the metal is selected from the group consisting of manganese, cobalt, iron, chromium and copper, and the halide is selected from the group consisting of chloride, iodide and bromide to produce an effluent containing the corresponding carbonyl compound.
2. The process as defined in claim 1 wherein the melt contains a mixture of cuprous and cupric chloride.
3. The process as defined in claim 2 wherein the melt further includes a univalent metal halide.
4. The process as defined in claim 3 wherein the univalent metal halide is an alkali metal chloride.
5. The process as defined in claim 2 wherein the feed contains an alkane having 1 to 18 carbon atoms.
6. The process as defined in claim 2 wherein the feed contains a cycloalkane having 4 to 12 carbon atoms.
7. The process as defined in claim 2 wherein the feed contains an alkene having 2 to 18 carbon atoms.
8. The process as defined in claim 2 wherein the feed contains an alkyl substituted benzene wherein the alkyl group has 1 to 4 carbon atoms.
9. The process as defined in claim 2 wherein the feed contains an alkenyl substituted benzene wherein the alkenyl group has 2 to 4 carbon atoms.
10. The process as defined in claim 2 wherein the feed contains ethane and the effluent contains acetaldehyde.
11. The process as defined in claim 2 wherein the feed contains propane and the effluent contains propionaldehyde.
12. The process as defined in claim 2 wherein the feed contains toluene and the effluent contains benzaldehyde.
13. The process as defined in claim 1 wherein the halide is chloride.
14. The process as defined in claim 2 wherein the contacting is effected by contacting the feed and oxygen-containing gas in the vapor phase with a flowing melt.
15. The process as defined in claim 2 wherein the melt contains from about 20% to about 40%, by weight, of potassium chloride and the cupric chloride is present in an amount of at least 5%, by weight.
16. A process for producing a carbonyl compound from a feed containing at least one member selected from the group consisting of methane, ethane, propane, a butane, ethylene, propylene, a butene, cyclohexane, cyclododecane, toluene, a xylene and styrene, comprising:
 contacting the feed in vapor phase and an oxygen-containing gas with a molten mixture of cuprous and cuprous and cupric chloride, containing at least 5%, by weight, of cupric chloride, at a temperature from about 500° F. to about 950° F. to produce an effluent containing the corresponding carbonyl compound.

17. The process as defined in claim 16 wherein the molten mixture further includes potassium chloride, said potassium chloride being present in an amount from about 20% to about 40%, by weight, of the mixture.

References Cited

UNITED STATES PATENTS

| | | | |
|---|---|---|---|
| 3,057,915 | 10/1962 | Riemenschneider et al. | |
| | | | 260—604 Ac |
| 3,184,512 | 5/1965 | Blair | 260—604 |

FOREIGN PATENTS

| | | | |
|---|---|---|---|
| 176,438 | 3/1922 | Great Britain | 260—604 |
| 976,268 | 11/1964 | Great Britain | 260—604 |

BERNARD HELFIN, Primary Examiner

U.S. Cl. X.R.

252—441; 260—348.5 R, 514 R, 515 R, 530 R, 586 B, 597 R, 604 R